United States Patent [19]

Keith

[11] Patent Number: 5,492,214

[45] Date of Patent: Feb. 20, 1996

[54] MOVEABLE PALLET FOR A TOOL

[75] Inventor: Malcolm E. Keith, West Chicago, Ill.

[73] Assignee: Midaco Corportion, Elk Grove Village, Ill.

[21] Appl. No.: 170,794

[22] Filed: Dec. 21, 1993

[51] Int. Cl.$^6$ .................................................. B65G 37/00
[52] U.S. Cl. .................... 198/346.1; 29/33 P; 198/774.4
[58] Field of Search .............................. 198/345.3, 346.1, 198/774.4; 29/33 P

[56] References Cited

U.S. PATENT DOCUMENTS

| | | | |
|---|---|---|---|
| 4,739,871 | 4/1988 | Maier et al. | 198/346.1 |
| 4,797,989 | 1/1989 | Cherko | 198/345.3 |
| 5,038,920 | 8/1991 | Nelson | 198/774.4 |

*Primary Examiner*—Joseph E. Valenza
*Attorney, Agent, or Firm*—Hill, Steadman & Simpson

[57] ABSTRACT

A control for moving a pallet relative to first and second base plates including four carriages that are rotatably supported on the second base plate by second rollers and which can be moved by pistons that are mounted in cylinders that are attached to the second base plate. The first plate has downwardly extending members formed with slanted slots and each of the four carriages have first rollers received in the slots so that as the pistons are moved in the cylinders the first base plate and the pallet are raised and lowered relative to the second base plate. Third rollers are mounted between the pallet and the first base plate so that they are movable relative to each other.

1 Claim, 3 Drawing Sheets

MOVEABLE PALLET FOR A TOOL

BACKGROUND OF THE INVENTION

1. Field of the Invention

This invention relates in general to moveable pallets for tools and in particular to an improved pallet.

2. Description of Related Art

Pallets are used in machines for supporting work pieces which are to be machined and at times it is desirable to move the pallet relative to a base upon which it is supported.

SUMMARY OF THE INVENTION

The present invention provides a pallet which is rotatably supported on a first set of rollers from a support plate so that it can be moved relative to the support plate. The support plate is formed with a plurality of downwardly extending planar members that are formed with slots and four moveable carriages that carry rollers which extend into the slots. Carriages are selectively moveable by cylinders such that as the carriages are moved from a first position wherein the pallet is closely adjacent the base member to a second position wherein the pallet is raised relative to the base member.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure, and in which:

DETAILED DESCRIPTION OF THE PREFERRED EMBODIMENTS

Figure 1:
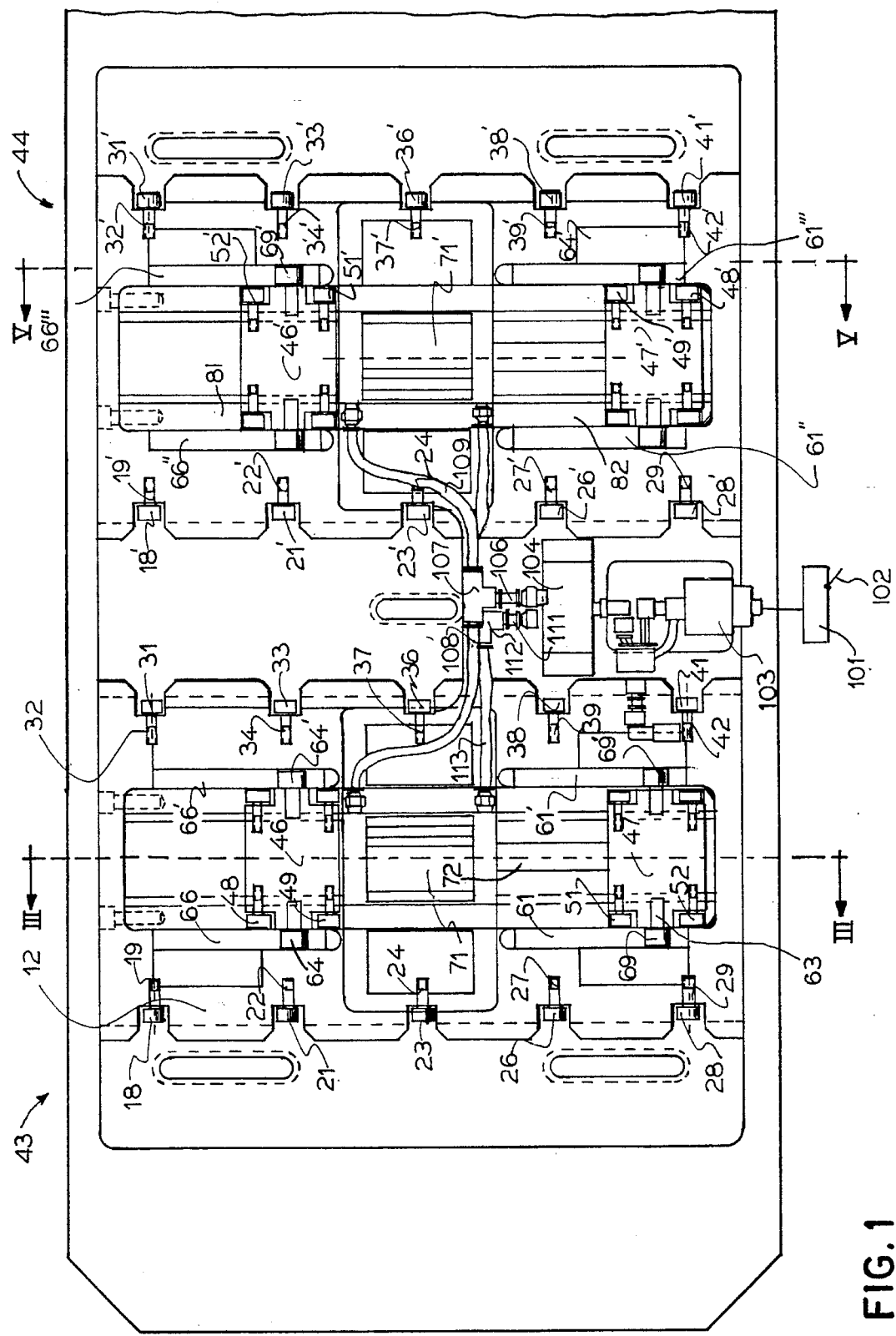
FIG. 1 is a top plan view of the improved pallet of the invention.
Figure 2:
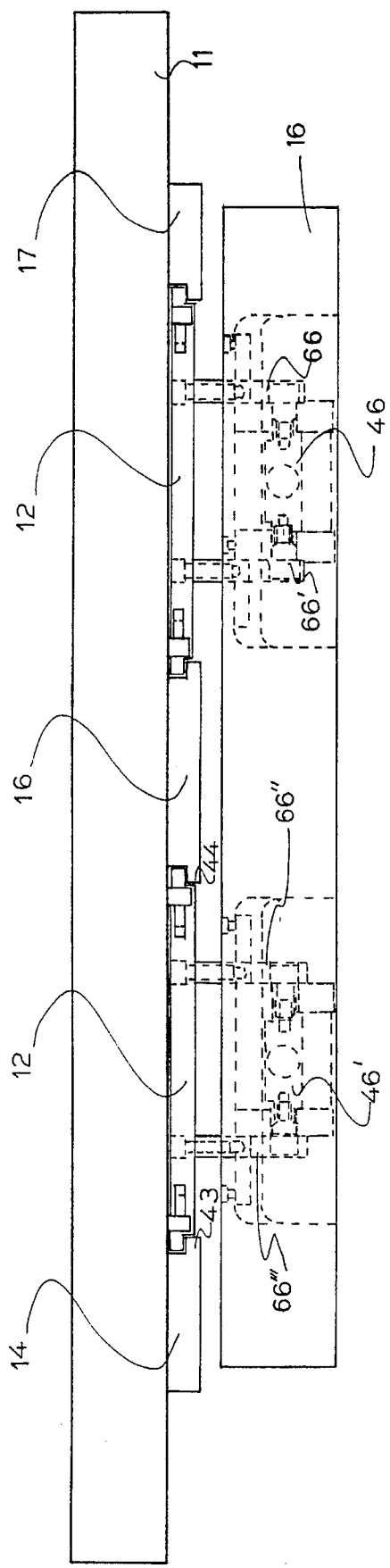
FIG. 2 is a back view of the invention.

FIGS. 1 and 2 illustrate a pallet 11 which is rotatably supported by rollers from a base plate 12. Base plate 12 carries a plurality of rollers which are mounted on shafts such as, for example, shaft 19 which is mounted in base plate 12 and carries a roller 18 which engages the bottom surface of the pallet 11 as shown in FIGS. 1 and 2. The base plate 12 also carries shaft 22 upon which roller 21 is mounted and shaft 24 upon which roller 23 is mounted and shaft 27 upon which roller 26 is mounted and shaft 29 upon which roller 28 is mounted, shaft 32 upon which roller 31 is mounted, shaft 34 upon which roller 33 is mounted, shaft 37 upon which roller 36 is mounted, shaft 39 upon which roller 38 is mounted and shaft 42 upon which roller 41 is mounted. Also, rollers 18', 21', 23', 26', 28', 31', 33', 36', 38' and 41' are mounted on shafts 19', 22', 24', 27', 29', 32', 34', 37', 39', and 42' as illustrated in FIG. 1.

Attached to the bottom of pallet 11 are plates 14, 116 and 17 as illustrated in FIG. 2 which are provided with projections 43, 44, 46 and 47 which engage projections on the rollers so as to hold the pallet 11 to the base plate 12. Thus, the pallet 11 can be moved relative to the plate 12 on the rollers thus described.

A second base plate member 16 moveably supports the base plate 12 as illustrated in the FIGS. 2–5 by carriages which have rollers that are mounted on rails. Also, shafts with rollers extend from the carriages and are received in slots mounted on downwardly extending members from the base plate 12 such that as the carriages are moved on the member 16 the base plate 12 and pallet 11 will be moved in the vertical direction relative to the member 16.

There are four carriages 46, 46', 47 and 47' rotatably supported on member 16 and each of the carriages support rollers which are received in inclined slots formed in members that are attached to the base plate 12 so that as the carriages move relative to the member 16, they selectively raise and lower the member 12 relative to the member 16, and thus the pallet 11 is raised and lowered.

Two carriages are provided on the left side of FIG. 1 and are designated by numerals 46 and 47 and two carriages 46' and 47' are mounted on the right side of the device relative to FIG. 1. The structure on the left side is designated by numeral 43 and the structure on the right side is designated by numeral 44. Since such structures are identical to each, the structure on the left side will be described in detail.

Figure 5:
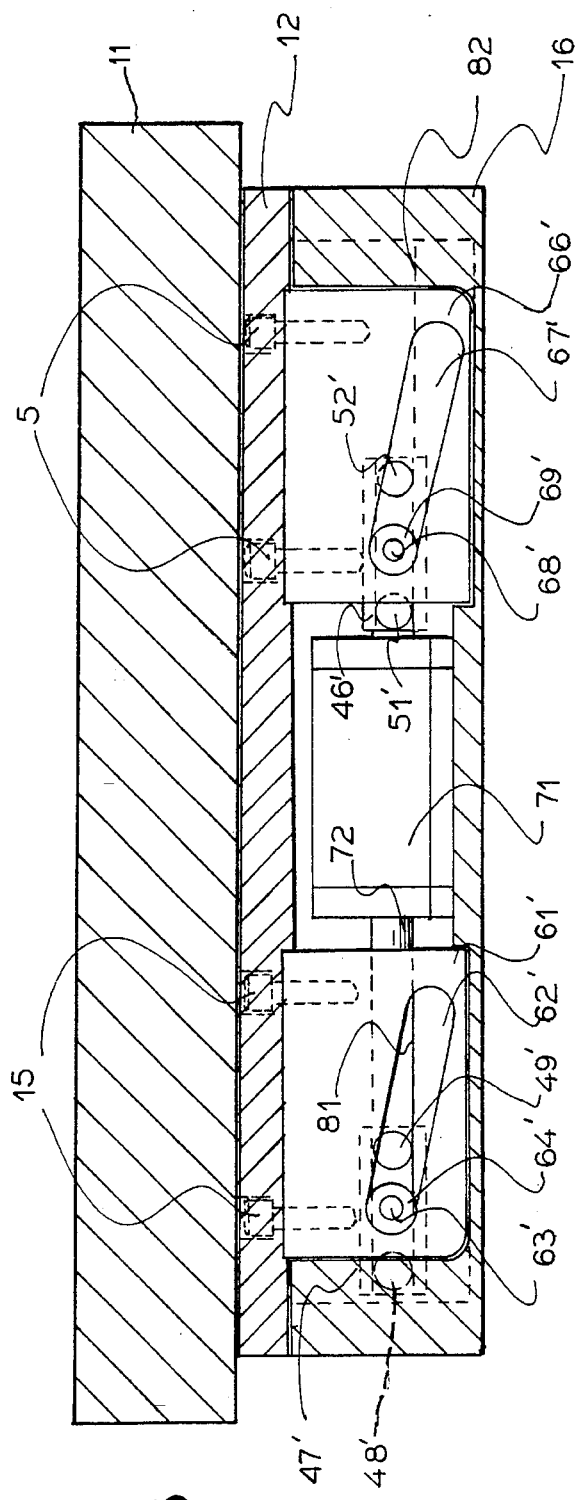
FIG. 5 is a sectional view taken on line V—V from FIG. 1.

As shown in FIG. 5, carriage 47 rides on rail and carriage 66' rides on rail 82. Carriage 46 has four rollers mounted on suitable shafts with two extending from either side as shown in FIG. 1, for example, where rollers 48 and 49 extend from the left side and the equivalent rollers extend from the right side. Carriage 47 has rollers 51 and 52 which extend on shafts from the left and equivalent rollers on the other side thereof. The carriages 46' and 47' are also provided with four rollers two on each side which ride on suitable rails 81 and 82. Plates 61 and 61' extend from base plate 12 downwardly on either side of the carriage 47 and the vertical plates 66 and 66' extend downwardly on either side of carriage 46 from plate 12. Suitable bolts 15 lock the plates 61 and 66 to the plate 12. Plates 61" and 61"' extend downwardly on either side of the carriage 47' from plate 12. Plates 66" and 66"' extend down from plate 12 on either side of carriage 46'. Each of the plates 61, 61', 61" and 61"' as well as plates 66, 66', 66" and 66"' are formed with slanted slots. For example, plate 61 is formed with a slanted slot 62 and plate 66 is formed with slanted slots 67. A shaft 63 which carries roller 69 extends from either side of the carriage 47 and the roller 69 is received in the slot 62 formed in the plates 61 and 61'. Carriage 46 also is provided with an extending shaft upon which rollers 64 and 64' are mounted which are received in slots 67 and 67' formed in the plate 66 and 66'. Equivalent rollers 64 and 64' extend from carriage 46' and are received in slanted slots in the plates 66" and 66"'. Equivalent rollers 69 and 69' extend from the carriage 47' and are received in slanted openings 67 and 67' formed in the plates 61" and 61"'. A piston 71 is mounted on member 16 between the carriages 46 and 47 and has a piston rod 72 which is attached to the carriages 46 and 47. A piston 73 can be moved in the cylinder 71 so as to mover the carriages 46 and 47 from the right most position shown in FIG. 3 to the left most position shown in FIG. 5 so as to lower and raise base plate 12 and the pallet 11 relative to the member 16.

Figure 3:
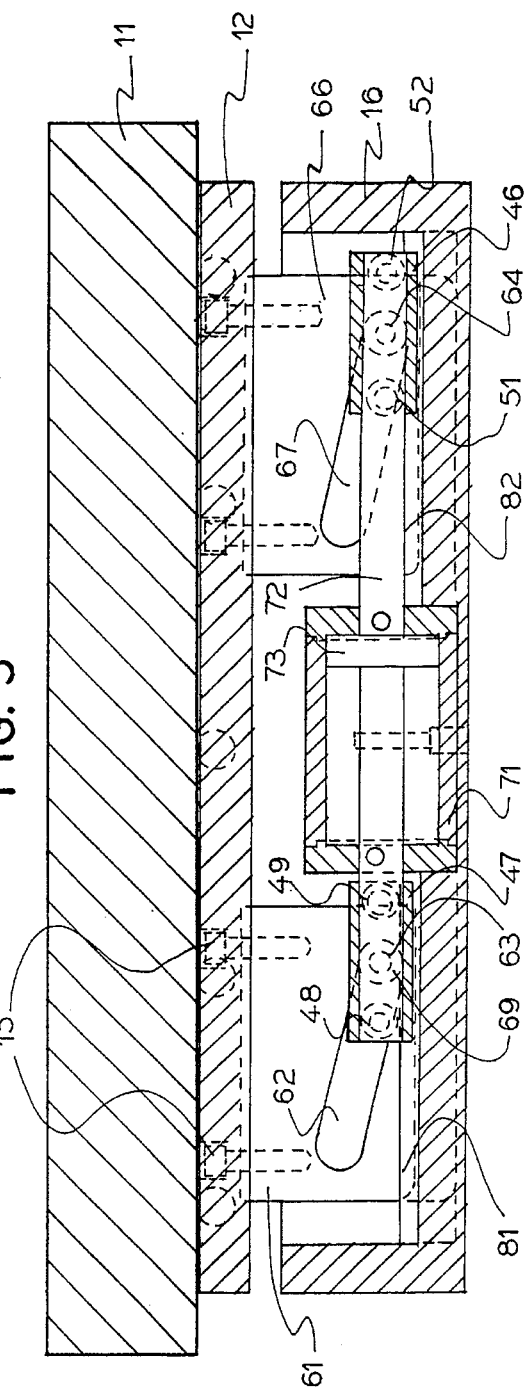
FIG. 3 is a sectional view taken on line III—III from FIG. 1.
Figure 4:
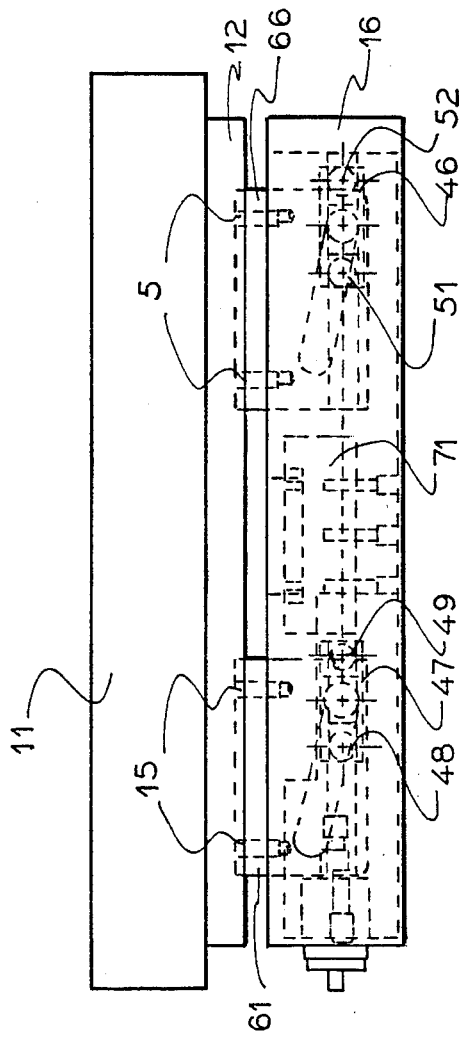
FIG. 4 is a view from the right side of FIG. 1.

FIG. 5 illustrates the pallet 11 and the plate 12 in the down position relative to member 16 wherein the piston 73 has been moved to the left end of cylinder 71 relative to FIGS. 5 and 3 so that the rollers 64' and 69' move to the left with the carriage in slots 62' and 67' to move base plate 12 and the pallet 11 to the down position as shown in FIG. 5. When the piston 73 is moved to the right position as shown in FIG. 3, the carriages 46 and 47 move to the right relative to FIG. 3 which moves the base plate 12 and the pallet 11 to the raised position shown in FIG. 3. Thus, by selectively energizing the cylinder 71 to move the piston 73, the carriages 46 and 47 can be moved from the right to the left positions shown in FIGS. 3 and 5 to lower and raise the pallet 11 relative to member 16. As shown in FIG. 1, the carriages 46' and 47' are driven by a cylinder 71' mounted between them in the same manner that the carriages 46 and 47 are driven so as to raise and lower the pallet 11 and base plate 12 simultaneously on both the left and right sides of the device.

An actuator 101 has a position control 102 which is connected to a hydraulic system 103 which supplies hydraulic fluid to a valve 104. In a first position of valve 104, fluid is supplied through a tube 106 and a T connection 107 to tubes 108 and 109 for supplying fluid to the upper ends of cylinders 71 and 71' relative to FIG. 1 so as to drive the piston 73 in the down direction relative to FIG. 1 to move the piston to the position shown in FIG. 3. In the second position of the valve 104 which is controlled by the control 102, the valve 104 supplies hydraulic fluid through a tube 111 to a T tube 112 which supplies fluid to a tube 113 so as to move the pistons 73 in the up direction relative to FIG. 1 to the position shown in FIG. 5. A tube which is the same as tube 113 extends from the T tube 112 to the lower end of cylinder 71' relative to FIG. 1 so as to move the carriages 46' and 46'.

Thus, it is seen that the present invention provides means for raising and lowering a pallet by selectively supplying hydraulic fluid to opposite ends of cylinders to drive pistons so as to move carriages which carry rollers that are mounted in slanted slots so as to raise or lower the base plate 12 and the pallet 11. The rollers 18, 21, 23, 26, 28, 31, 33, 36, 38 and 41 allow the pallet to be moved in the vertical direction relative to FIG. 1 and relative to the base plate 12. Means are provided for limiting the movement between base plate 12 and the pallet 11 which comprise stops which limit the amount of motion.

Although the invention has been described with respect to preferred embodiments, it is not to be so limited as changes and modifications can be made which are within the full intended scope of the invention as defined by the appended claims.

I claim as our invention:

1. Means for vertically moving a pallet and a first base plate member relative to a second base plate member comprising, a second planar base plate member, a plurality of carriages rotatably mounted on said second planar base plate member and each of said carriages formed with extending horizontally supported first rollers, a first base plate member formed with downwardly extending vertical members each of which is formed with slanted slots in which said first rollers are received, a pallet supported by said first base plate member, driving means connected to said carriages to drive them so as to move said first rollers in said slanted slots so as to selectively raise and lower said first base plate member and said pallet relative to said second base plate member, a plurality of second rollers mounted on said plurality of carriages and engageable with said second base plate member so as to rotatably mount said plurality of carriages on said second planar base member, a plurality of rails mounted on said second base plate member upon which said plurality of second rollers ride, said driving means comprises a hydraulic cylinder with a piston rod coupled to said carriages and said cylinder fixedly mounted on said second planar base plate member, and including a plurality of third rollers mounted between said pallet and said first base plate member so that said pallet can be moved horizontally relative to said first base plate member.

* * * * *